3,134,795
REMOVAL OF FOREIGN COMPONENTS FROM FAT-CONTAINING TISSUE

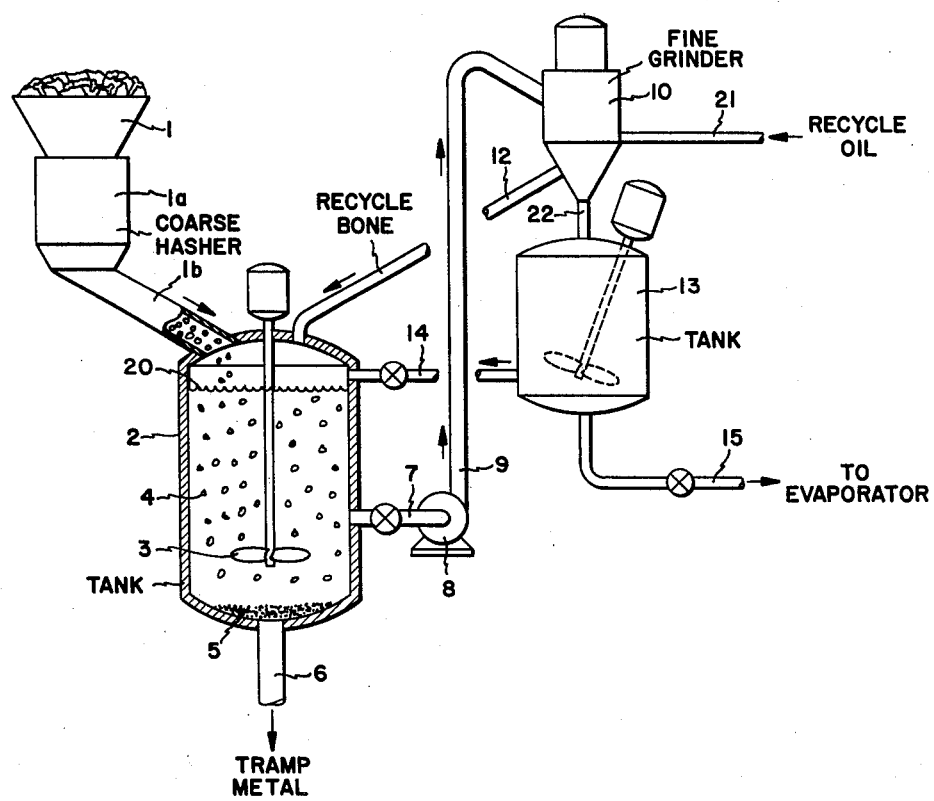

Charles Greenfield, 3 Templeton Arms, N. Broad St., Elizabeth, N.J.
Filed Feb. 23, 1962, Ser. No. 174,986
3 Claims. (Cl. 260—428)

This invention relates to improvements in the removal of foreign components from fat-containing tissue. More particularly, it relates to a process wherein tissue of this nature is injected into an agitated body of liquid fat whereby the contaminants are removed from the remaining residual tissue components.

The rendering and dehydrating of fat-containing proteinaceous tissue in fluid systems in the presence of added fat is known, e.g., see Patent No. 2,911,421 and application, Serial No. 837,105, filing date, August 31, 1959, now U.S. Patent No. 3,076,715. These processes have become of increasing commercial interest.

One of the problems in those processes arises from the presence of contaminants in the tissue being treated such as tramp metals, stones, etc., particularly the former, which arises from slaughter house techniques and material handling. This foreign matter causes problems in passing through various pieces of downstream equipment such as fine grinders, evaporators, pumps, and centrifuges.

Tramp metals are conventionally removed by magnetic and similar means. This is insufficient at best and in the presence of non-magnetic metals such as copper and stainless steel, almost useless. Metal detectors, while more efficient, are relatively expensive and still leave a good deal to be desired.

This invention provides an improved process for removing these contaminants which overcomes the before-mentioned difficulties. The method comprises coarsely grinding the tissue and then injecting the ground material into an agitated body of liquid fat. The velocity of the agitated fat is sufficient to suspend substantially all the tissue components except the contaminants which settle out. The tissue components thus freed of substantially all the contaminants are recovered in the liquid fat for subsequent use in other processing as stated above. Specific features are described in further detail.

The fat-containing proteinaceous tissue to which this process is particularly applicable includes the well known animal fat tissues such as beef fat, pig fat, lamb fat, veal fat, pig fat with skins, bones, viscera and other organs, and animal fats which have been treated with brine. While other fat-containing protein products can be treated by the process of this invention, the latter is particularly suited for the animal products derived from packing houses and known as inedible grade.

While the contaminants principally desired to be removed are the so-called tramp metals, the process lends itself, by selection of the proper agitation velocities, to the settling of similar contaminants such as gravel, stones, glass, etc. which normally are also present. The materials thus removed are characterized by being of higher density than the tissue components it is desired to recover and it is expressly intended to cover those types of separations also.

The tissue is coarsely ground, i.e., to pieces of about $\frac{1}{4}''$ to $4''$ diameter and preferably $\frac{1}{2}''$ to $1\frac{1}{2}''$.

In the preferred range of grinding, standard low cost sewage type centrifugal pumps can be utilized. However, other pumps can be utilized which will pump the suspension of the larger pieces. The grinding can take place in the presence of added fat; see Patent No. 2,911,421.

The liquid fat into which the ground tissue is injected can be the same kind as that present in the natural fat-containing substance or it can be another fat satisfactory for the operation. Typical fats thus are: beef tallow, lard and white grease, etc. The amount of coarse solids in the agitated fat body is in a range of about 5 to 35 wt. percent based on the agitated total mixture. The temperature of this liquid body of fat is in the range of roughly about 100° to 300° F. The agitation velocity is determined by empiric methods and depends on the quantity relationships, size of the vessel, etc. There the velocity of the agitator is adjusted to that at which the metal components and other high density materials mentioned settle out while the residual tissue is suspended. Depending on tank size, velocities of about 200–1,000 r.p.m. have been used for a turbine type agitator.

The body of liquid fat can also contain finely ground material recycled in liquid fat from the operation so as to reduce the settling rate of the coarse solids. This is particularly advantageous in recycling a supply of finely ground material from the fine grinder to the fluidizing tank. Such a recycle supply will also provide the pump with sufficient flow rate for proper operation.

As stated previously, substantially all of the contaminants are removed by the process of this invention. Thus, 90–99 wt. percent of the tramp metals have been removed. These materials can be present in the raw tissue in substantial amounts to small quantities depending on previous history.

This invention will be better understood by reference to the following example and flow diagram shown in the drawing.

Referring now to the flow diagram, bones and fat as received from the slaughter house are dumped into storage hopper 1 of coarse hasher 1a so that pieces of 1" diameter discharge through chute 1b into tank 2. The tank has a body of liquid fat 20 at a temperature of 120° F. An agitator 3 keeps the contents suspended so that only the tramp metal particles 4 settle out in section 5 in the tank and can be withdrawn through discharge line 6. The fluid slurry containing the tissue components, e.g., bone, fat, meat and connective tissue are withdrawn through line 7 and pumped by centrifugal sewage pump 8 to fine grinder 10. The coarse solid contained in line 7 is approximately 10 wt. percent of the total mixture but can vary depending on product requirements.

In grinder 10 the coarse solids are ground to a smaller diameter, i.e., in the range of about $\frac{1}{8}''$ to $1''$. Recycle oil is added to grinder 21 and permits of the recycle of oil and fine bone through line 12 to tank 2.

The slurry is discharged from grinder 10 through line 22 into agitator tank 13. Further oil and fine bone flows through valve line 14 so as to maintain a constant level in tank 2.

The agitation velocity in tank 13 is 400 r.p.m. Valved line 15 leading to an evaporator contains a continuous flow of fluid mixture of finely ground tissue and can contain from 10 to 40 wt. percent of the fluid mixture pumped to grinder 10 through line 9. The system is kept in balance through valve regulated line 14.

Example 1

5,000 lbs. of super market inedible fat and bones containing 5 lbs. of tramp metals are ground in the coarse grinder which passes the metal through. The ground material is treated as taught in the preceding description and 4.7 lbs. of the metal settle out and are withdrawn. The balance of the metal is very fine and is usually imbedded in the tissue particles thus being innocuous in nature.

If desired, a preliminary stage of magnetic separation can be employed before the coarse grinder to remove heavy iron that could be destructive and reduce the life of the coarse grinder. Pieces of iron or metal passing through the coarse grinder would be removed by this process. Any small light metal getting through such as bottle caps containing cork could be readily handled by the fine grinder without difficulty or maintenance problems.

The advantages of the process of this invention are quite numerous. Contaminants are removed in a unique efficient manner so as to prevent costly damage to expensive equipment. Process shut downs are rendered not serious because the placing of the principal agitator on stream after it had been stopped results in the resuspension of the tissue components but not the tramp metals.

In a similar fashion, ground bones can be advantageously separated into its mineral and protein constituents by controlled velocity so that the minerals or larger bone pieces separate from the protein. This can be accomplished with or without removal of moisture in the mixture of ground bones in a fatty suspension. In this fashion, collagen, the protein of bone, can be obtained in a highly concentrated state for further manufacture into gelatin, soup stock, and glue. A bone meal is the by-product.

It is to be understood that this invention is not limited to the specific examples which have been offered merely as illustrations and that modifications may be made without departing from the spirit of the invention.

What is claimed is:

1. A continuous process for separating metal contaminants present with proteinaceous tissue which comprises the steps of: coarsely grinding the tissue to particles having a diameter in the range of ¼ to 4"; injecting the ground tissue into an agitated body of liquid fat, the agitated fat velocity being sufficient to suspend substantially all the tissue components except the metal contaminants which settle out; and recovering the tissue components in the liquid fat freed of substantially all the metal contaminants.

2. The process of claim 1 in which the liquid fat body is at a temperature in the range of about 100–300° F.

3. The process of claim 1 including the additional step of more finely grinding the recovered tissue components and recycling a portion of them in liquid fat to the agitated body.

References Cited in the file of this patent

UNITED STATES PATENTS

| | | |
|---|---|---|
| 2,168,942 | McClave | Aug. 8, 1939 |
| 2,450,398 | Sanders | Sept. 28, 1948 |
| 2,823,214 | Sharples | Feb. 11, 1958 |
| 2,911,421 | Greenfield | Nov. 3, 1959 |
| 3,023,161 | Luvisi et al. | Feb. 27, 1962 |

OTHER REFERENCES

"Fats and Oils" by Kirschenbauer, Reinhold Pub. Co., New York 1944, page 47.